April 16, 1957 B. J. KLEERUP 2,788,970
INSIDE OUT FILM TAKE-UP
Filed Feb. 1, 1955
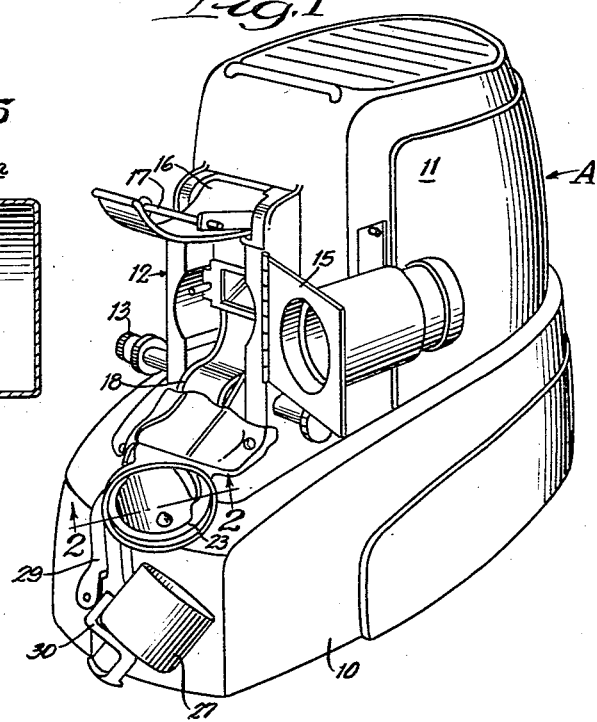
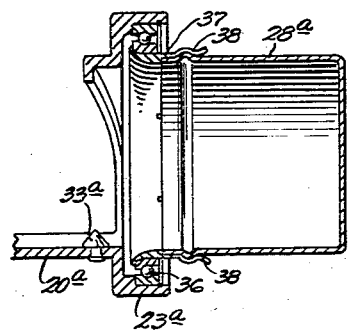
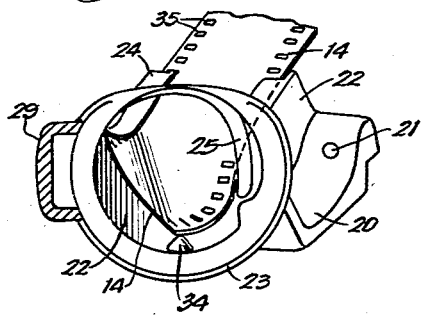
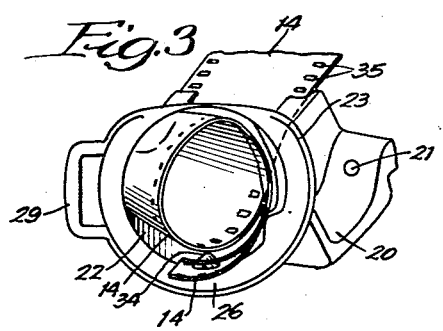
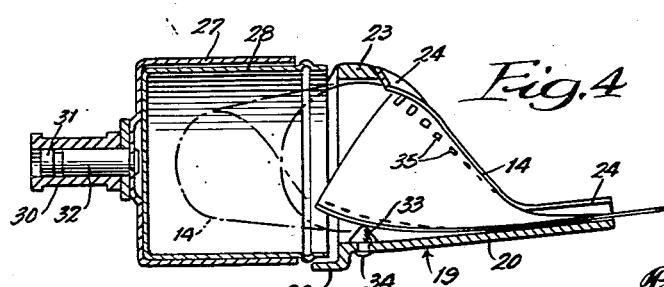
INVENTOR:
Bertel J. Kleerup,
BY
Dawson, Tilton & Graham,
ATTORNEYS.

United States Patent Office 2,788,970
Patented Apr. 16, 1957

2,788,970

INSIDE OUT FILM TAKE-UP

Bertel J. Kleerup, Kenilworth, Ill., assignor to Society For Visual Education, Inc., Chicago, Ill., a corporation of Delaware Application February 1, 1955, Serial No. 485,560

4 Claims. (Cl. 271—2.19)

This application relates to a rewind take-up for film, and more particularly to film take-ups for filmstrip projectors in which the filmstrip is wound in condition for storing in standard containers.

The present application is a continuation-in-part of my copending application, Serial No. 416,929, filed March 17, 1954, which, in turn, is a continuation-in-part of abandoned application, Serial No. 289,071, filed May 21, 1952.

As indicated in my above earlier applications, a filmstrip is taken up and wound within a standard container for storing, or, if desired, for immediate reshowing as a single operation while the film is being projected. It is of the utmost importance that the film be wound upon itself in a reverse manner, with the portion of the film first entering the container lying adjacent the surface of the container and the portion of the film subsequently entering being wound interiorly of the first portion of the film. With the film thus wound from the outside in, it is ready for immediate reshowing without first having to be rewound. This is the reverse of the ordinary winding, leaving the leading end on the outside. To accomplish this result, it is necessary that the leading edge of the film, when the film is being turned into a spiral shape, extend below the edge of the succeeding portion of the film. Unfortunately, the film employed varies in stiffness, flexibility, and form, so that it cannot be determined with certainty that the winding (from the outside in) of the film will be brought about in the container or can receiving it, and often the leading edge of the film will engage an interior surface of the succeeding film so that the forward portion of the film winds within itself and the resulting film is not ready for reshowing, but must be rewound. Any handling of the film is not desired because of injury that might result to the delicate surface of the film. It has been found that fingerprinting and other soiling of the film makes the film less desirable for projection purposes and causes deterioration of the film due to the salt from human hands causing a corrosive action thereon.

An object of the present invention is to provide means whereby the film is caused to wind, from the outside in, within the storing container or can irrespective of the variations in the character of the film itself. A further object is to provide positive means guiding the entering film for effective coiling action while at the same time spacing a rear portion of the film so that the forward coiled end portion of the film always extends under the rear portion of the film to insure reverse winding. A still further object is to provide, in a rewind take-up structure, means for rewinding the film in reverse within a removable container or can which can be lifted from the take-up apparatus and stored in the container or can, etc. Yet another object is to provide an improved take-up device having the properties and characteristics hereinafter described in detail. Such other specific objects and advantages will appear as the specification proceeds.

The invention is shown, in illustrative embodiments, by the accompanying drawing, in which—

Figure 1 is a perspective view of a projector equipped with rewind take-up mechanism embodying my invention; Fig. 2, a broken perspective view, shown partly in section, the section being taken as indicated at line 2—2 of Fig. 1; Fig. 3, a view similar to Fig. 2, but showing the film in an advance stage of rewinding; Fig. 4, a longitudinal sectional view; and Fig. 5, a broken, longitudinal, sectional view of a modified form of rewind take-up mechanism.

In the illustration given in Figs. 1 to 4, inclusive, A designates a film projector, having a base 10 in which driving motors, gears, etc. are housed. A light housing 11 is mounted upon the base 10, and a film feed and driving mechanism 12 is shown which includes operating knobs 13 equipped with sprockets (not shown) for engaging perforations in the film 14 for advancing the same. The projector is equipped with a lens housing 15 hinged to one side of the housing 11. A film support 16 is equipped with a spring-urged bar 17 for supporting a roll of film while it is being fed through the apparatus, and the mechanism 12 is provided with the usual guide 18 having side flanges for receiving the edges of the film and for directing it outwardly and downwardly toward the film rewind take-up 19. Since the projector structure described is well known, and since the invention herein is directed to the rewind take-up, a detailed description of the foregoing mechanism is believed unnecessary.

The rewind take-up 19 includes a guide member 20 provided at its rear with openings 21, through which screws or other means may be passed to secure the guide member 20 to the housing of the projector. The member 20 is provided with a twisted or curved guide channel 22 and terminating in a ring member 23, the film 14 being finally discharged in a twisted or helical form through the outlet provided by the ring 23.

To confine the outer free edge of the film during the curving or twisting action, I provide a flange strip 24 which extends from a point at the rear of the guide member 20 forwardly and then upwardly and around a portion of the ring 23, the flange strip having a finger portion 25 depending from the ring, as shown best in Fig. 2.

The ring 23 is preferably provided, near its lower and bottom side, with a forwardly-projecting flange 26.

To receive the film as it is coiled in reverse, I provide a receptacle or container 27 in which is freely supported a can 28 such as, for example, the ordinary shipping can in which the film is received. The receptacle or holder 27 is larger than the can 28 and freely receives the can, so that the can itself may adjust in the winding operation to the film as it is being wound therein. For supporting the holder 27, I prefer to equip the ring 23 with an integral extension 29, to the end of which is pivotally supported an arm 30. The arm 30 provides at its inner end a sleeve 31 receiving a pin 32. The pin 32 is secured to the inner side of the holder or container 27 for rotatably supporting the can 28. The extension 29 and the arm 30 extend forwardly and downwardly at an angle so that the holder is supported in a slightly upwardly tilted direction. Thus, when the holder is swung to outer position, as illustrated in Fig. 1, the can 28 therein will not fall out but at the same time is exposed for ready and easy removal.

I have discovered that the desired reverse winding can be positively controlled and insured by securing within the guide 20 and near the base thereof a boss or projection 33. In the specific illustration given, the boss 33 is in the shape of a conical pin or abutment, and it is equipped with a neck which extends through a hole in the guide 20 and the lower end of the pin is then swaged to form a locking head 34. With the structure shown, the boss 33 engages the leading edge of the film so as to deflect it effectively in the initial winding operation, and the boss thus holds the film at a spaced distance above the bottom of the guide 20 so that the forward curved edge of the film, when reversing upon itself, is thus guided beneath and outside of the following film portion.

*Operation*

In the operation of the structure shown in Figs. 1 to 4, inclusive, the film 14 is fed from the support 16 through the projection portion of the apparatus and then is discharged from the guide portion 18 onto the rewind take-up 19. After the forward edge of the film progresses through the curved guide 20 and below the lap of the flange strip 24, the film turns in a direction so as to form a coil or roll upon itself. The boss 33 not only facilitates this operation, but also supports a rear portion of the film, as shown best in Fig. 3, so that the leading edge of the film, as it is winding upon itself, necessarily has to pass under the raised following portion of the film. Such an operation is indicated in dotted lines in Fig. 4. Furthermore, the boss 33 engages an inner edge of the film bearing the spaced openings 35, so that the contact with the boss does not in any way tend to mar or mark the image-bearing portion of the film. Such contact is illustrated best in Figs. 2 and 3 of the drawing. The film thus guided is positively directed into an arrangement in which the leading portion of the film always lies adjacent the inside wall of the can 28, and the winding is thus in the desired reversing manner. After the film has been rewound, the container 27 may be swung outwardly to the position shown in Fig. 1, and the can 28 containing the film may be removed. If desired, spring means, or any suitable means, may be employed for urging the holder 27 toward the closed position illustrated in Fig. 4.

In the modification illustrated in Fig. 5, the guide member 20a is equipped with a ring 23a containing a ball-bearing race 36, which supports a cone member 37 having spring fingers 38 releasably engaging the can 28a. The guide 20a is equipped with a boss 33a, similar to that shown in Figs. 2 to 4 inclusive, and the operation of the boss in insuring the desired reverse wind of the film is the same. After the film is wound in reverse within the can 28a, the same may be removed by simply drawing the can rearwardly to free it from the friction fingers 38.

While, in the foregoing specification, I have set forth specific structures in considerable detail for the purpose of illustrating the invention, it will be understood that such details of structure may be varied widely by those skilled in the art without departing from the spirit of my invention.

I claim:

1. In combination with a film rewind take-up having a guide which is twisted to bend the delivered end of the film into a helical shape, a receptacle for receiving the film as it is wound, and a boss carried by said guide adjacent an edge of the film and engaging only the edge portion thereof for raising one edge of the film following the leading edge, whereby the leading edge is directed under the film for winding from the outside in.

2. In combination with a film rewind take-up having a film guide turned to deliver the film in a coiled shape, a support adjacent the outlet of said film guide, a can holder rotatably mounted upon said support, and a film can having one end thereof open received freely within said holder and with the open end thereof facing the outlet of said film guide, said film guide being provided with a raised boss adjacent the delivery end thereof and engaging only the edge portion of the film for lifting one edge of the film to space the same from the bottom of the guide.

3. The structure of claim 2, in which the holder is supported in an upwardly-inclined position.

4. In combination with a film rewind take-up having a film guide which is twisted to bend the delivered end of the film into a helical shape, a holder member rotatably mounted upon the delivery end of said guide, and a film can releasably carried by said holder with the open end of the can facing the delivery end of said guide, said guide having a boss extending upwardly from the bottom thereof at the delivery end of said guide and engaging only the edge portion of the film for raising the edge of the film portion following the leading edge thereof, whereby the leading edge is directed under the film for winding from the outside in.

References Cited in the file of this patent

UNITED STATES PATENTS

| | | |
|---|---|---|
| 1,119,489 | Bingham | Dec. 1, 1914 |
| 2,085,439 | Morlock | June 29, 1937 |
| 2,278,367 | Freimann et al. | Mar. 31, 1942 |